Patented Dec. 31, 1935

2,026,467

UNITED STATES PATENT OFFICE 2,026,467

WELDROD AND PROCESS OF WELDING

John Howe Hall, High Bridge, N. J., assignor to Taylor-Wharton Iron & Steel Company, High Bridge, N. J., a corporation of New Jersey No Drawing. Application August 8, 1930, Serial No. 474,069

7 Claims. (Cl. 219—10)

The invention relates to weldrods and processes for both electric arc and gas welding and, while usable with excellent results in the joining of ordinary steel plates, was devised principally for use, and has achieved outstanding results, in the welding of plates or structures containing from ten to fifteen percent manganese. More specifically, the invention finds its chief utility in the repairing of manganese steel castings and forgings, as, for example, in the building up or restoring, by weld deposit metal, of the badly worn surfaces of special trackwork, such as manganese steel frogs and crossings, switches and the like, and in repairing, by weld deposit metal, the broken or otherwise damaged areas of similar or other manganese steel castings and forgings.

Manganese steel is dependent for its characteristics of tough hardness combined with ductility upon proper heat treatment and for that reason is extremely difficult properly to weld. In an average weld, even when the deposited metal is of proper composition and properly toughened during the progress of the welding, the transition area or partially fused zone between the deposited metal and the unaffected parent metal is made weak and brittle by the heating and partial fusion to which it is subjected. This embrittlement and loss of strength is due to the liberation of carbides in and between the austenite crystals of the metal, and the strength and toughness of the steel so affected can be only partially restored by heat-treatment.

After extended experimentation and study I have concluded that the liberation of carbides with its resultant brittleness and weakness is due to the relatively high carbon content of the parent metal, viz. 1.10 to 1.40%. Hence, in one aspect my invention consists in obviating or materially reducing the liberation of carbides by diluting the carbon of the partially fused or transition zone. In another aspect my invention consists in impregnating the transition zone with nickel to make it susceptible to air toughening and to avoid conditions making for burning.

In short, the objects of the invention are to provide for first-class weldability regardless of the source of heat for depositing the weld metal; and to insure welds of high tensile strength and ductility.

In accordance with my inventive thought I use a weldrod containing ten to fifteen per cent manganese, one to five per cent nickel, about decimal thirty to about decimal eighty-five per cent carbon, and an effective amount of silicon; the preferred composition being an iron or steel alloy containing thirteen per cent manganese, three per cent nickel, decimal seventy-five per cent carbon and from decimal fifteen to two decimal five per cent silicon. The higher the silicon content, within the range stated, the better the insurance of realizing the ultimate object of soundness of weld notwithstanding that dependence is had on the air toughening properties of the metal of the weld. The relatively high content of silicon enables the steel to dissolve a high proport'on of the gases which cause blow holes. One of the contributory factors to the accomplishment of this result is that the silicon reduces the oxides of iron and manganese present, forming $SiO_2$ which goes into the slag, so that with less oxide of manganese and of iron present there is less tendency to the formation of CO gas when the steel solidifies by the reaction between the carbon of the steel and such oxides. The silicon, therefore, is important in that it has both a direct and indirect effect in preventing the formation of blow holes and, hence, makes for sound steel. A high silicon content is of utility in substantially eliminating the formation of slag and scale, thereby insuring greater fluidity of the weld depositing metal. The ideal range of silicon content is from about one decimal twenty-five to about one decimal sixty per cent. Moreover, the high silicon content, such as indicated, lessens the cost of production of the air toughening steel.

In most cases the desired composition in the deposited metal is secured by using a rod of the above analysis. However, I do not restrict myself to the use of such a rod, as one or more of the constituents—manganese, nickel, carbon, and silicon may be introduced in the deposited metal by using rods containing some of these constituents, which have been coated with materials containing a high percentage of some of the other constituents, in the well-known or conventional manner.

Thus, for instance, a rod containing ten to fifteen per cent manganese, decimal thirty to one per cent carbon, and one decimal five per cent silicon may be coated with a ferro-nickel or metallic nickel in sufficient amount to give the desired percentage of nickel in the deposited metal. The same may be done in the case of the manganese and the silicon by using coatings containing ferro alloys of high percentages of these elements, or these elements in the metallic state.

Similarly, part or all of the carbon may be contained in the metals or alloys so used as a coating. It is possible also to add the nickel, the manganese, the silicon, or the carbon to the pool of deposited metal while it is still in the fluid condition. The merit of the invention consists in securing a deposited metal of the correct composition, and the scope of this invention is not to be limited to any one method of securing the desired composition in the deposited metal.

The effect of the low percentage of carbon in the deposit metal is, as before stated, to dilute the relatively high carbon content of the partially fused or transition zone of the parent metal and so reduce or prevent the liberation of carbides. The nickel impregnates the transition zone and renders the same susceptible to air toughening. And if a sufficient amount of chrome is present in the deposited metal, the welded area readily lends itself to hardening under cold working.

It is a further characteristic of the invention that the rods, pencils or wires embodying the described air toughened manganese steel do not require flux coating. However, the use of a flux coating or covering is a matter of expediency or choice according to the particular shop or field practice and whether the welding is done with alternating or direct current.

Having described my invention, I claim:

1. The method of restoring worn surfaces or repairing otherwise damaged parts of articles constructed of ferrous alloys containing ten to fifteen per cent manganese and one to one decimal four per cent carbon, more or less, which consists in establishing substantially non-carbide forming conditions by depositing air toughened manganese steel containing less carbon than the parent stock to dilute the carbon content of the partially fused or transition zone of the parent metal.

2. The method of producing sound welds in articles constructed of ten to fifteen per cent manganese steel with the usual high carbon content characteristic of such steel, which consists in effecting a weld deposit of metal containing ten to fifteen per cent manganese, one to five per cent nickel, and a less percentage of carbon than the parent stock, for the purpose and with the result of diluting the relatively high carbon content of the partially fused or transition zone and of substantially reducing the liberation of carbides.

3. The method of producing a strong ductile weld of manganese steel containing one to one decimal four per cent carbon, which consists in welding by depositing manganese steel having air toughening properties and a lower percentage of carbon than that of the parent stock in order to dilute the carbon of the parent stock and thereby obviate conditions tending to embrittlement and loss of strength and toughness.

4. The method of producing sound welds of manganese steel, that is to say, iron or steel alloy containing ten to fifteen per cent manganese and from substantially one to one decimal four per cent carbon, which consists in welding by depositing ferrous metal containing ten to fifteen per cent manganese, nickel in sufficient amount up to about five per cent to insure air toughening and an essentially lower carbon content than that of the parent stock whereby the carbon content of the parent stock is diluted and the nickel impregnates the partially fused or transition zone and makes it responsive to air toughening.

5. The method of producing sound welds of articles constructed or iron or steel alloys containing ten to fifteen per cent manganese and substantially one to one decimal four per cent carbon, which consists in effecting a fusion weld with an iron or steel alloy containing ten to fifteen per cent manganese, one to five per cent nickel, and a carbon content materially less than that of the parent stock for the purpose and with the result of diluting the carbon content of the partially fused or transition zone.

6. The method for re-surfacing or otherwise repairing austenitic manganese steel articles which contain carbon in sufficiently high amount to liberate carbides and cause embrittlement under ordinary conditions of weld deposit, which consists in depositing manganese steel having air toughening properties, a carbon content essentially lower than that of the parent stock in order to minimize carbide precipitation, and sufficient silicon to keep the pool quiescent and permit substantial dilution of the carbon in the transition zone.

7. A weldrod for re-surfacing or otherwise repairing austenitic manganese steel articles which contain carbon in sufficiently high amount to liberate carbides and run the hazard of embrittlement under ordinary conditions of welding, said rod containing manganese substantially in the proportion of that of the article, a proportionately lower rate of carbon to minimize carbide precipitation, not over five per cent nickel to impart air toughening properties to the transition zone of the parent metal, and silicon in sufficient amount up to two decimal seventy-five to prevent gasifying.

JOHN HOWE HALL.